(12) United States Patent
Hill et al.

(10) Patent No.: US 11,280,769 B2
(45) Date of Patent: Mar. 22, 2022

(54) MECHANISMS AND METHODS FOR LIQUID SAMPLE INTRODUCTION INTO A CHROMATOGRAPHY SYSTEM

(71) Applicant: Waters Technologies Corporation, Milford, MA (US)

(72) Inventors: Jason Hill, Milford, MA (US); Abhijit Tarafder, Blackstone, MA (US); Michael O. Fogwill, Uxbridge, MA (US); Thomas McDonald, Littleton, MA (US); Sylvain Cormier, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 313 days.

(21) Appl. No.: 16/678,454

(22) Filed: Nov. 8, 2019

(65) Prior Publication Data

US 2020/0150097 A1 May 14, 2020

Related U.S. Application Data

(60) Provisional application No. 62/757,904, filed on Nov. 9, 2018.

(51) Int. Cl.
*G01N 30/20* (2006.01)
*B01D 15/40* (2006.01)
(Continued)

(52) U.S. Cl.
CPC ............. *G01N 30/20* (2013.01); *B01D 15/40* (2013.01); *G01N 30/32* (2013.01); *G01N 30/34* (2013.01);
(Continued)

(58) Field of Classification Search
CPC ........ B01D 15/14; B01D 15/70; G01N 30/20; G01N 30/201; G01N 30/202; G01N 35/1097; G01N 2035/1058
See application file for complete search history.

(56) References Cited

U.S. PATENT DOCUMENTS 6,576,125 B2  6/2003  Berger et al.
6,790,361 B2  9/2004  Wheat et al.
(Continued)

OTHER PUBLICATIONS

Miller at al. "Evaluation of injection conditions for preparative supercritical fluid chromatography." J. Chromatogr. A. 1250(2012): 256-263.

*Primary Examiner* — Justin N Olamit
(74) *Attorney, Agent, or Firm* — Womble Bond Dickinson (US) LLP; Deborah M. Vernon (57) ABSTRACT

The disclosure relates to a system for liquid sample introduction into a chromatography system. The system includes a syringe, a first valve in fluid communication with the syringe, a second valve in fluid communication with the sample, a vessel located between, and in fluid communication with, the first and second valves, a third valve in fluid communication with the first valve, the second valve and a chromatography column, and a pump in fluid communication with the third valve and a mobile phase. When the valves are in a first position the syringe draws the sample into the vessel. The mobile phase flows to the chromatography column. When the valves are in a second position, a portion of the mobile phase flows into the vessel, mixing with and pressurizing the sample. When the valves are in a third position, the mixed and pressurized sample flows to the chromatography column.

21 Claims, 7 Drawing Sheets

(51) Int. Cl.
*G01N 30/34* (2006.01)
*G01N 30/32* (2006.01)
*G01N 30/02* (2006.01)

(52) U.S. Cl.
CPC . *G01N 2030/027* (2013.01); *G01N 2030/201* (2013.01); *G01N 2030/202* (2013.01); *G01N 2030/326* (2013.01); *G01N 2030/328* (2013.01); *G01N 2030/347* (2013.01)

(56) References Cited

U.S. PATENT DOCUMENTS

| | | | |
|---|---|---|---|
| 8,414,774 B2* | 4/2013 | LaMarr | G01N 35/00584 |
| | | | 210/656 |
| 9,857,339 B2* | 1/2018 | Hewitson | G01N 30/20 |
| 10,241,013 B2* | 3/2019 | Field | G01N 30/20 |
| 10,500,583 B2* | 12/2019 | Wiederin | G01N 35/1097 |
| 11,112,390 B2* | 9/2021 | Cormier | G01N 30/20 |

\* cited by examiner

MECHANISMS AND METHODS FOR LIQUID SAMPLE INTRODUCTION INTO A CHROMATOGRAPHY SYSTEM

CROSS REFERENCE TO RELATED APPLICATIONS

This application claims priority to and benefit of U.S. provisional patent application No. 62/757,904 filed Nov. 9, 2018, the entire contents of which is incorporated herein by reference in its entirety.

FIELD OF THE TECHNOLOGY

The present disclosure relates to systems and methods for liquid sample introduction into a chromatography system. More specifically, the present disclosure relates to systems and methods for mixing a liquid sample with a highly compressible fluid (for example, carbon dioxide) to mix and pressurize the liquid sample prior to introduction into a chromatography system. In particular, the systems and methods of the present technology include at least three valves and a vessel arranged in a configuration to provide improved injection into a chromatography system.

BACKGROUND

Highly-compressible fluid chromatography is a type of chromatography that is configured to operate with a solvent that includes a fluid (e.g., carbon dioxide, Freon, etc.) that is in a gaseous state at ambient/room temperature and pressure. Typically, highly-compressible fluid chromatography involves a fluid that experiences noticeable density changes over small changes in pressure and temperature. Although highly compressible fluid chromatography can be carried out with several different compounds, in the current document, $CO_2$ will be used as the reference compound as it is the most commonly employed. (It is noted that highly-compressible fluid chromatography has also been referred to as $CO_2$-based chromatography, or in some instances as supercritical fluid chromatography (SFC), especially where $CO_2$ is used as the mobile phase.)

Introducing a liquid sample into a mobile phase can create a mismatch between the compositions of the sample and the composition of the mobile phase. Differences between the compositions of the sample and mobile phase can create significant loss of system performance. For example, in supercritical fluid chromatography (SFC), when a liquid sample is introduced into a mobile phase that includes a highly compressible fluid (e.g., carbon dioxide), it leads to severe peak distortion. This peak distortion is especially common for early eluting compounds in SFC and can lead to yield and/or productivity loss in preparative SFC.

Figure 1:
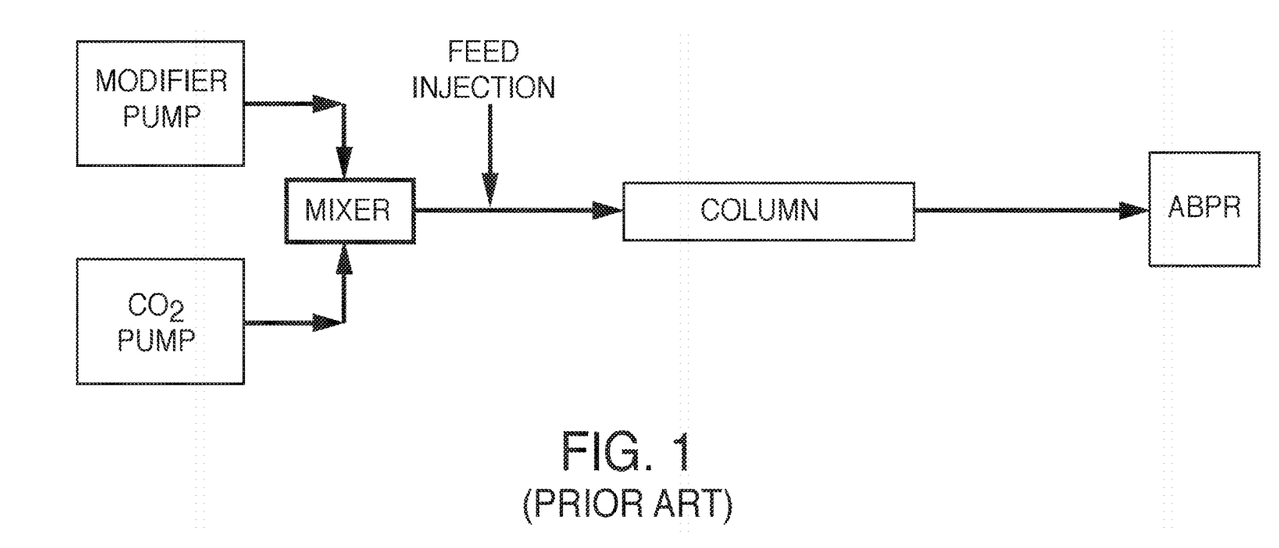
FIG. 1 is a block diagram showing a prior art mixed stream injection mechanism for chromatography.
Figure 2A:
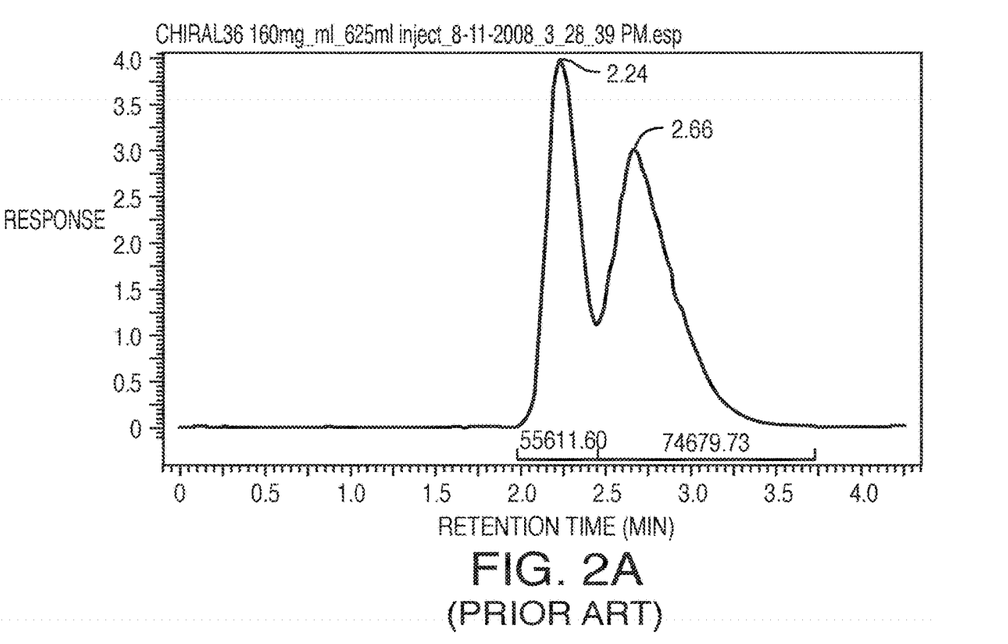
FIG. 2A is a chromatogram from a preparative separation using a mixed stream injection method of the prior art where the load was kept constant at 11 mg and the injection volume was 0.63 mL.
Figure 2B:
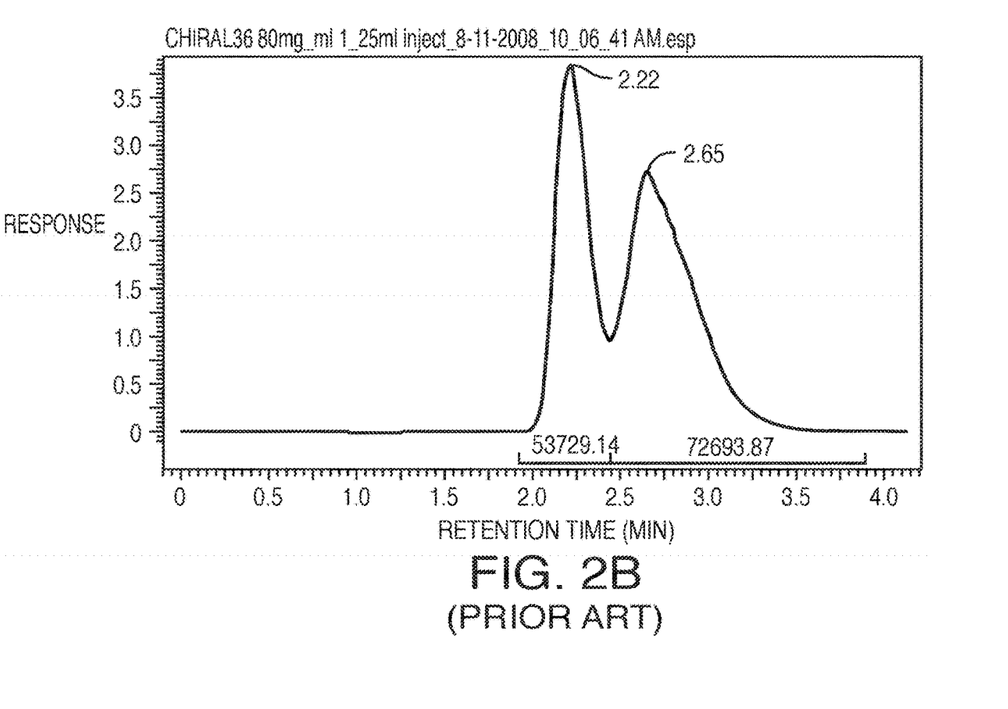
FIG. 2B is a chromatogram from a preparative separation using a mixed stream injection method of the prior art where the load was kept constant at 11 mg and the injection volume was 1.25 mL.
Figure 2C:
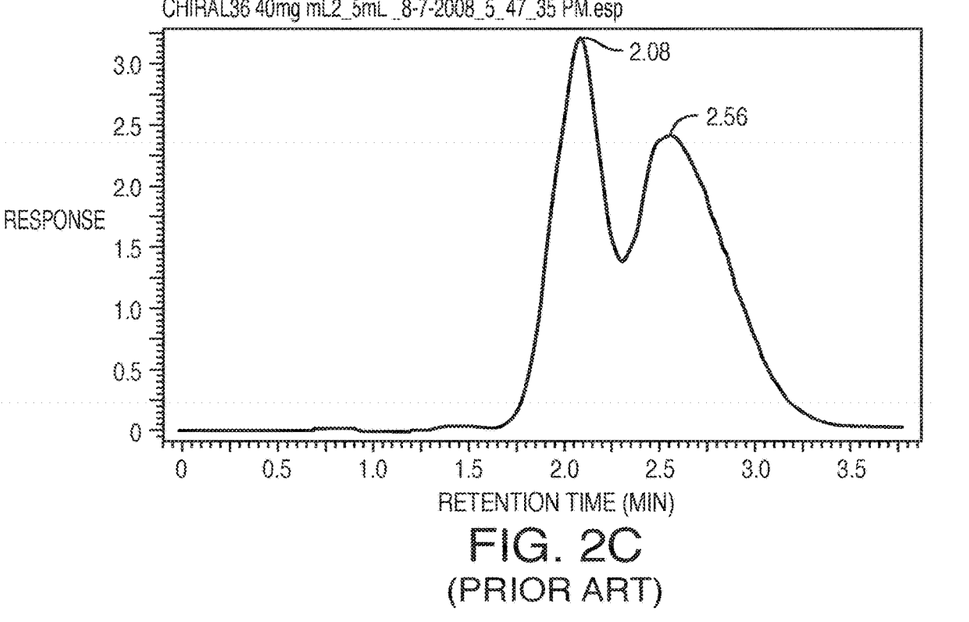
FIG. 2C is a chromatogram from a preparative separation using a mixed stream injection method of the prior art where the load was kept constant at 11 mg and the injection volume was 2.5 mL.
Figure 2D:
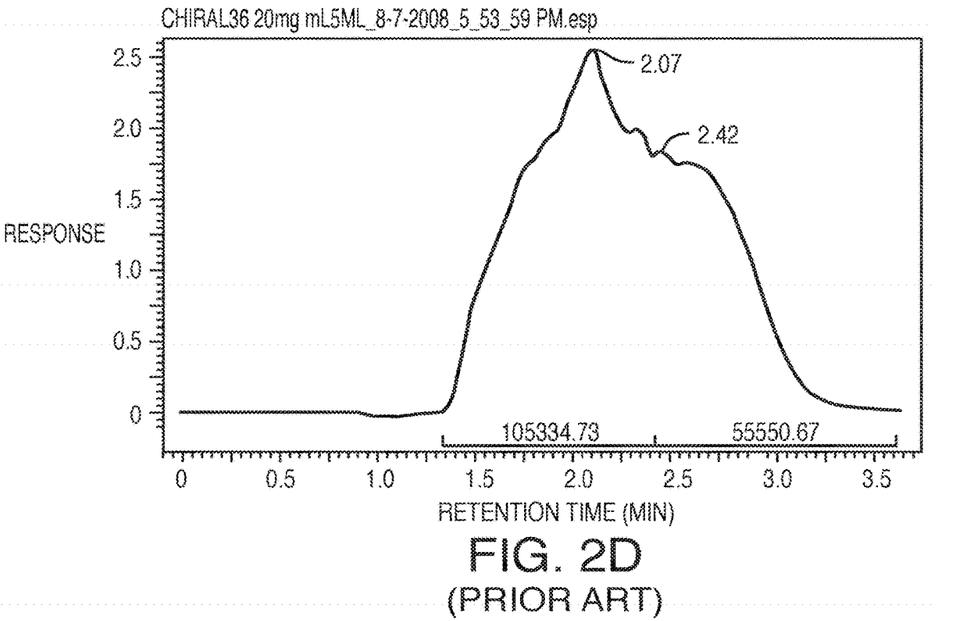
FIG. 2D is a chromatogram from a preparative separation using a mixed stream injection method of the prior art where the load was kept constant at 11 mg and the injection volume was 5 mL.

The most commonly used injection method in SFC (both analytical and preparative) is the so-called mixed-stream injection. This is the same mechanism that is typically used in liquid chromatography, for example, in high performance liquid chromatography (HPLC), where the sample (or feed) is injected directly into the mobile phase before the mobile phase flows to the column (see, FIG. 1). In HPLC often the sample is prepared in a solvent that matches the mobile phase composition to prevent peak distortion. However, in SFC, preparing the sample with a carbon dioxide based solvent is not directly possible, the solvent mismatch leads to significant problems with peak dispersion and/or distortion (see FIGS. 2A-D) As can be seen in FIGS. 2A-D, severe distortion of peaks can be observed with increasing injection volume.

SUMMARY

The present technology solves the problems of the prior art such that liquid sample can be drawn in, mixed with the SFC mobile phase (e.g., carbon dioxide) and then injected into a chromatography column.

The embodiments of the present disclosure provide advantages over the prior art by reducing the sample-solvent vs. mobile phase mismatch in an SFC system and hence (1) results in sharper peaks leading to increased resolution in an analytical system, and (2) allows injecting more sample in a preparative system leading to increased productivity.

The embodiments of the present technology relate to three-valve systems and methods for liquid sample introduction into a chromatography system. The three-valve systems and methods utilize a vessel to mix the liquid sample with a mobile phase (e.g., $CO_2$) prior to injecting the liquid sample into a chromatography column. In particular, the systems and methods of the present technology include at least three valves and a vessel arranged in a configuration to provide improved injection into a chromatography system. The three-valve system provides a mechanism that results in sharper peaks leading to increased resolution and allows injecting more sample in a preparative system to increase productivity.

In one aspect, the technology relates to a system for liquid sample introduction into a chromatography system. The system includes a sample syringe for drawing up a sample. The system also includes a first multi-port valve in fluid communication with the sample syringe and a second multi-port valve in fluid communication with the sample. A vessel is located between, and is in fluid communication with, the first and second multi-port valves. A third multi-port valve is in fluid communication with the first multi-port valve, the second multi-port valve and a chromatography column. A pump is in fluid communication with the third multi-port valve and a mobile phase. When the valves are in a first position the sample syringe draws the sample into the vessel and the mobile phase flows to the chromatography column. When the valves are in a second position, at least a portion of the mobile phase flows into the vessel, mixing with and pressurizing the sample. When the valves are in a third position, the mixed and pressurized sample flows to the chromatography column. The system can have one or more of the embodiments described herein, or combinations thereof.

In some embodiments, the system also includes a tee in fluid communication with the third multi-port valve, the second multi-port valve, and the column.

The first multi-port valve, the second multi-port valve and the third multi-port valve can be, for example, rotary valves, solenoid valves, or pneumatic valves. In some embodiments, the first multi-port valve, the second multi-port valve and the third multi-port valve each have four ports, six ports, eight ports, or ten ports. In some embodiments, the first multi-port valve, the second multi-port valve and the third multi-port valve each have the same number of ports. In some embodiments, the first multi-port valve, the second multi-port valve and the third multi-port valve each have different numbers of ports.

The mobile phase can be a highly-compressible solvent. The highly-compressible solvent can be carbon dioxide. The chromatography system can be supercritical fluid chromatography system (e.g., a $CO_2$-based chromatography system).

In another aspect, the technology relates to a method for introducing a liquid sample into a chromatography system. The method includes actuating a syringe in fluid communication with a first valve to draw (e.g., aspirate) the liquid sample through a second valve partially filling a vessel with the liquid sample, flowing a mobile phase through a third valve into a chromatography column, adjusting the second valve such that a first portion the mobile phase flows into the chromatography column and a second portion of the mobile phase flows into the vessel, thereby mixing and pressurizing the liquid sample and the mobile phase, and adjusting the first valve, the second valve and the third valve such that the mixed mobile phase and the liquid sample are injected into the chromatography column. The method can include one or more of the embodiments described herein, or combinations thereof.

In some embodiments, the vessel is positioned between the first and second valves.

The actuating and flowing steps can be performed simultaneously.

In some embodiments, the mobile phase is a highly-compressible solvent. The highly-compressible solvent can be carbon dioxide.

In another aspect, the technology relates to a system for liquid sample introduction into a chromatography system. The system includes a sample syringe for drawing up a sample. The system also includes a first multi-port valve in fluid communication with the sample syringe and the sample, a second multi-port valve in fluid communication with the first multi-port valve and a vessel, and a third multi-port valve in fluid communication with the second multi-port valve and a chromatography column. A pump is in fluid communication with the third multi-port valve and a mobile phase. When the valves are in a first position the sample syringe draws the sample and the mobile phase flows to the chromatography column. When the valves are in a second position, the sample flows from the sample syringe to the vessel and the mobile phase continues to flow to the chromatography column. When the valves are in a third position at least a portion of the mobile phase flows into the vessel, mixing with and pressurizing the sample. When the valves are in a fourth position, the mixed and pressurized sample flows to the chromatography column. The system can have one or more of the embodiments described herein, or combinations thereof.

In some embodiments, the system also includes a tee in fluid communication with the third multi-port valve, the second multi-port valve, and the column.

The first multi-port valve, the second multi-port valve and the third multi-port valve can be rotary valves, solenoid valves or pneumatic valves. The first multi-port valve, the second multi-port valve and the third multi-port valve each have four ports, six ports, eight ports, or ten ports. In some embodiments, the first multi-port valve, the second multi-port valve and the third multi-port valve each have the same number of ports. In some embodiments, the first multi-port valve, the second multi-port valve and the third multi-port valve each have different numbers of ports.

In some embodiments, the mobile phase is a highly-compressible solvent. The highly-compressible solvent can be carbon dioxide. The chromatography system can be a supercritical fluid chromatography system.

In another aspect, the technology relates to a method for introducing a liquid sample into a chromatography system. The method includes actuating a syringe in fluid communication with a first valve to draw the liquid sample through the first valve and into the syringe, flowing a mobile phase through a third valve into a chromatography column, adjusting the first valve such that liquid sample flows from the syringe into a vessel of a second valve, the liquid sample partially filling the vessel, adjusting the second valve such that a first portion the mobile phase flows into the chromatography column and a second portion of the mobile phase flows into the vessel, thereby mixing and pressurizing the liquid sample and the mobile phase, and adjusting the third valve such that the mixed mobile phase and the liquid sample are injected into the chromatography column. The method can include one or more of the embodiments described herein, or combinations thereof.

In some embodiments, the actuating and flowing steps are performed simultaneously.

The mobile phase can be a highly-compressible solvent. The highly-compressible solvent can be carbon dioxide.

BRIEF DESCRIPTION OF THE DRAWINGS

The technology will be more fully understood from the following detailed description taken in conjunction with the accompanying drawings, in which.

DETAILED DESCRIPTION

The technology relates to three-valve systems and methods for introducing a sample into a mobile phase, particularly with respect to the introduction of a liquid sample into a carbon dioxide mobile phase in a chromatography system. The technology reduces the sample-solvent vs. mobile phase mismatch in an SFC system and hence (1) results in sharper peaks leading to increased resolution in an analytical system, and (2) allows injecting more sample in a preparative system leading to increased productivity.

The method generally includes partially filling a vessel with a sample, substantially filling a remaining portion of the vessel with a mobile phase to form a mixed sample and mobile phase, and introducing the mixed sample and mobile phase into the chromatography system. The volume of sample that can be injected with this technology includes volumes less than 1 μL to volumes greater than 20 mL. The mobile phase can be a highly compressible solvent, for example carbon dioxide. The vessel can have a high pressure rating (for example, for use with pressures up to about 600 bar). In some embodiments, the vessel can be a cylinder or tubing. The vessel can have a volume of about 10 μL to about 50 mL, depending on the scale (e.g., analytical, preparative) of the chromatography. The apparatus works with a switching valve, a valve that can be moved into varying positions to alter the flow of the sample and/or the mobile phase. The chromatography system can be a super critical fluid chromatography system. This general method can be implemented several ways using a variety of different three-valve configurations, which are exemplified below. One of ordinary skill in the art will understand that there are other valve and system configurations that can be used to implement the method described above.

The technology can provide a system that works with three valves. FIGS. 3A-3D are schematics showing a three-valve system for liquid sample introduction into a chromatography system. The system 100 includes a sample syringe 105 for drawing up sample 110. The sample 110 can be drawn up from a sample reservoir (not shown). The system 100 also includes a first multi-port valve 115, a second multi-port valve 120, and a third multi-port valve 125. The first valve 115 is in fluid communication with the sample syringe 105. Fluid communication allows two members to communicate with each other via passageways or channels to provide a means of fluid flow between two or more vessels or members. The fluid communication can be between two liquids, two gases or a combination of liquids and gases.

The second valve 120 is in fluid communication with the sample 110. A vessel 130 is located between and is in fluid communication with the first valve 115 and the second valve 120. The third valve 125 is in fluid communication with the first valve 115, the second valve 120 and a chromatography column (not shown). A pump (not shown) is in fluid communication with the third valve 125 and a mobile phase (e.g., a highly compressible solvent, which can be carbon dioxide).

In some embodiments, a tee 135 is in fluid communication with the third valve 125, the second valve 120 and the chromatography column. The chromatography column can be, for example, a supercritical fluid chromatography column.

The first valve 115, the second valve 120, and the third valve 125 can each have six, eight, or ten ports. In some embodiments, the valves have less than six ports, for example four ports, or more than ten ports, for example twelve ports. The valves 115, 120, and 125 can be rotary valves, solenoid valves, or pneumatic valves. In some embodiments, the valves 115, 120, and 125 are all rotary valves. In other embodiments, the valves 115, 120, and 125 are all solenoid valves. In other embodiments, the valves 115, 120, and 125 are all pneumatic valves. The valves 115, 120, and 125 can be different valves, for example, valve 115 can be a rotary valve and valves 120 and 125 can be solenoid valves, or for example, valve 115 can be a rotary valve, valve 120 can be solenoid valve and valve 125 can be a pneumatic valve.

The mobile phase can be a highly-compressible solvent, for example, the mobile phase can be carbon dioxide.

Figure 3A:
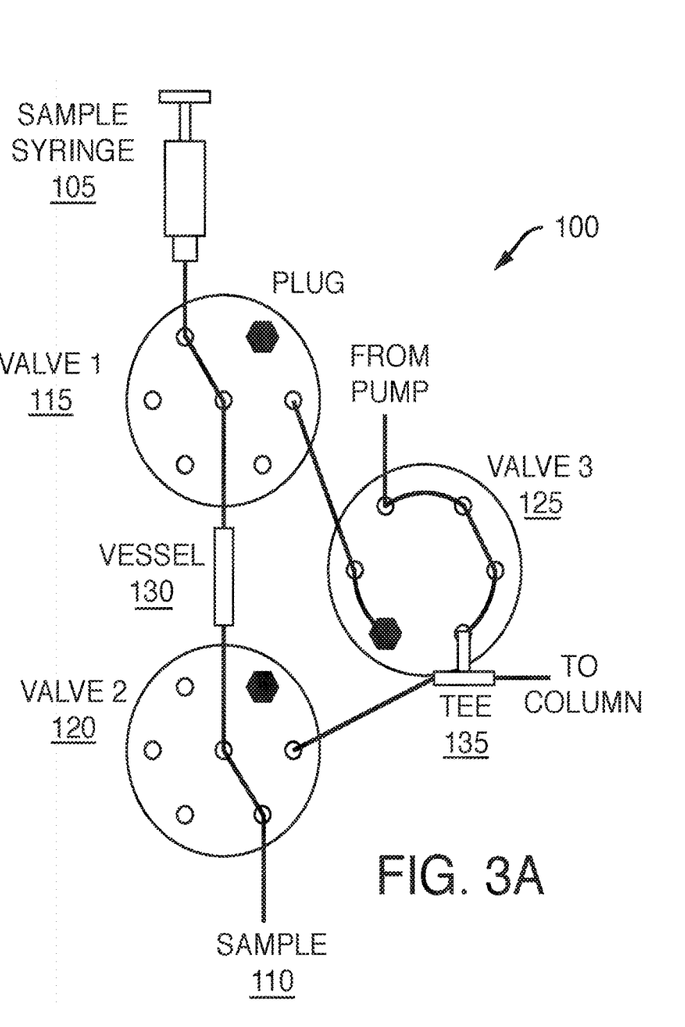
FIG. 3A is a schematic diagram showing a three-valve system for liquid sample introduction into a chromatography system with the valves in a first position, according to an illustrative embodiment of the technology.

When the valves 115, 120, 125, are in a first position, for example, the position shown in FIG. 3A, the sample syringe 105 draws the sample 110 into the vessel 130. The vessel 130 can be a tube, a cylinder or an enclosed volume of any shape or size. For example, the vessel can have a volume of about 10 μL to about 50 mL, depending on the scale (e.g., analytical, preparative) of the chromatography. The volume of the vessel can be considerably higher, for example double, the volume of the connecting tubes. The vessel 130 is partially filled with sample 110. For example, the vessel 130 can be a quarter, half or three-quarters filled with sample 110.

The mobile phase from the pump flows to the chromatography column. For example, as shown in FIG. 3A, the mobile phase flows through the third valve 125, into the tee 135, and then continues to the chromatography column.

Figure 3B:
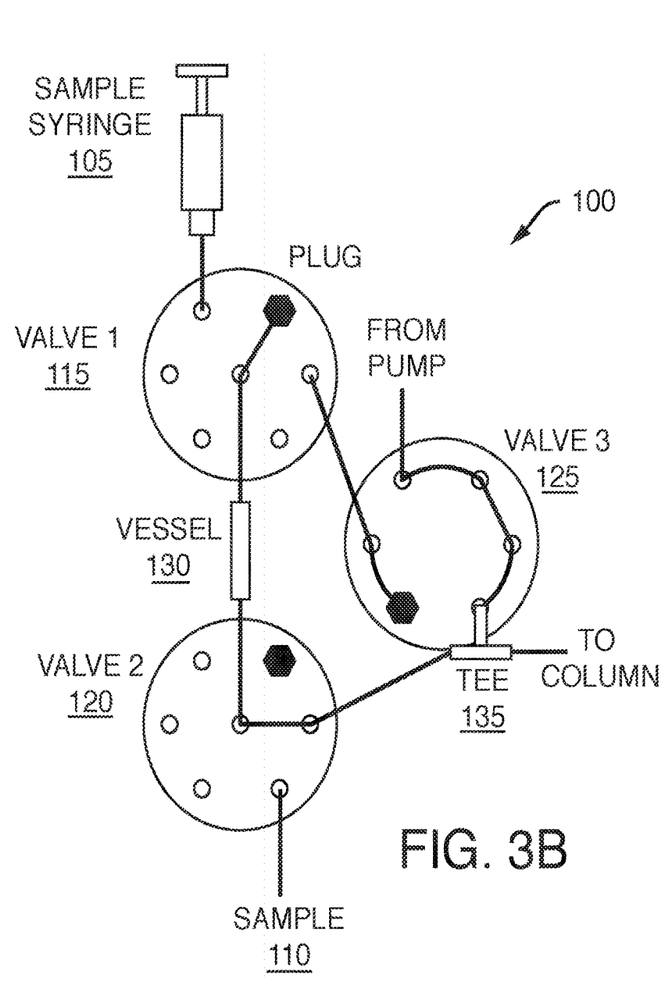
FIG. 3B is a schematic diagram showing a three-valve system for liquid sample introduction into a chromatography system with the valves in a second position, according to an illustrative embodiment of the technology.

Referring now to FIG. 3B, the valves 115, 120, and 125 are in a second position. In this second position, the first valve 115 can be in a plug position, the second valve 120 changes to be in line with the tee 135 from the third valve 125. In the second position shown in FIG. 3B, at least a portion of the mobile phase flows into the vessel 130, mixing with and pressurizing the sample, which is already contained within the vessel 130. The flow from the pump is split into two flows, for example by tee 135. A portion of the mobile phase flow from the pump flows through the third valve 125 and flows to the column and another portion of the mobile phase flow from the pump flows through the third valve 125 and fills any remaining volume of the vessel 130. In some embodiments, a majority (e.g., greater than 50%) of the mobile phase flows to the chromatography column. In some embodiments, the vessel 130 is completely full with the sample and mobile phase. In other embodiments, the vessel 130 is not completely full with the sample and mobile phase. In the vessel 130, the sample and mobile phase are pressure-equilibrated. Since there is no net flow towards the plug, once the vessel 130 is pressure-equilibrated, the sample can only leak into the mobile phase flow to the column through diffusion.

Figure 3C:
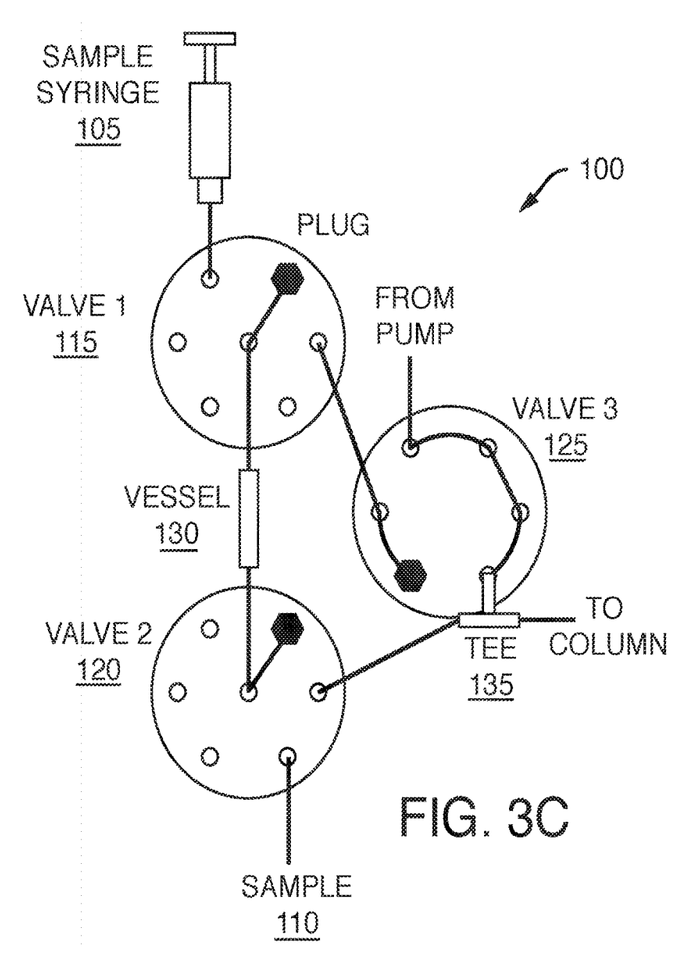
FIG. 3C is a schematic diagram showing a three-valve system for liquid sample introduction into a chromatography system with the second valve in a plug position to isolate the vessel, according to an illustrative embodiment of the technology.

In some embodiments, the second valve 120 changes to the plug position to isolate the vessel 130 (see FIG. 3C). Flow from the pump travels through the third valve 125 and continues towards the column. In some embodiments, the valve positions go directly from those shown in FIG. 3B to those shown in FIG. 3D.

Figure 3D:
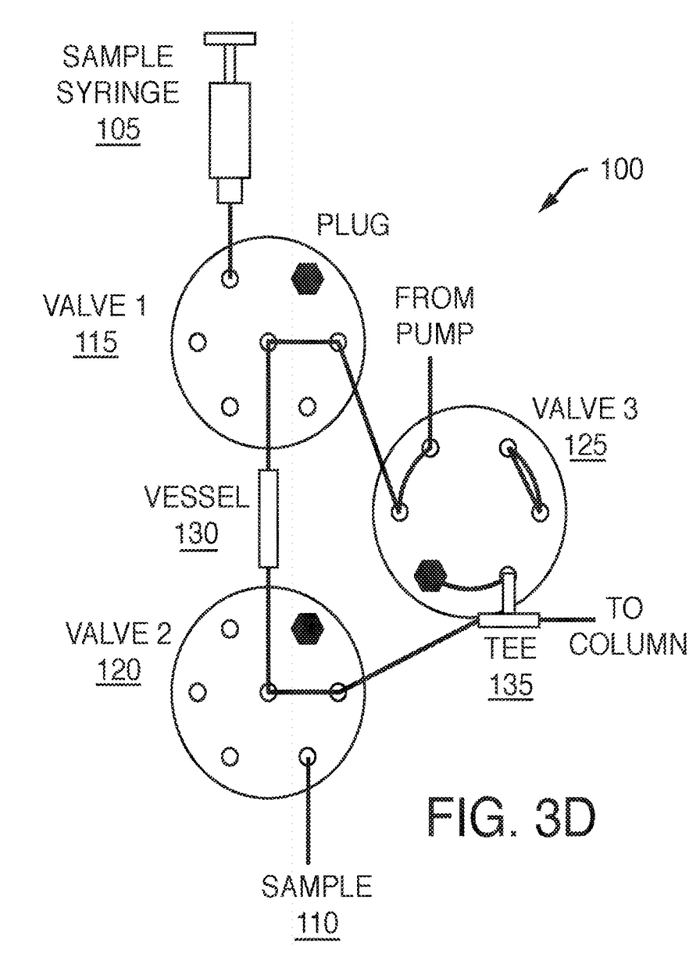
FIG. 3D is a schematic diagram showing a three-valve system for liquid sample introduction into a chromatography system with the valves in a third position, according to an illustrative embodiment of the technology.

Referring to FIG. 3D, the valves 115, 120, and 125 are in a third position, which allows the mixed and pressurized sample to flow to the chromatography column. In FIG. 3D, the first valve 115 changes position and the second valve 120 moves in line with the connections of the third valve 125. The mobile phase flow travels through the third valve 125, into the first valve 115, through the vessel 130, through the second valve 120, through the tee 135 connected to the third valve 125 and continues to the column. This injects the entire sample, diluted and prepared with the mobile phase, in the column.

A three-valve method for introducing a liquid sample into a chromatography system, for example the system of FIGS. 3A-3D is also provided. Referring to FIG. 3A, the method includes actuating a syringe 105 in fluid communication with a first valve 115 to draw liquid sample 110 through a second valve 120 partially filling a vessel 130 with the liquid sample 110. The mobile phase is flowed through a third valve 125 into a chromatography column, for example, a supercritical fluid chromatography column.

Referring to FIG. 3B, the method includes adjusting the second valve 120 such that a first portion of the mobile phase flows into the chromatography column and a second portion of the mobile phase flows into the vessel 130, thereby mixing and pressurizing the liquid sample and the mobile phase. In some embodiments, the first valve 115 is also adjusted to a plug position.

Referring to FIG. 3D, the first valve 115, the second valve 120, and the third valve 125 are each adjusted such that the mixed mobile phase and the liquid sample are injected into the chromatography column. For example, the first valve 115 changes position and the second valve 120 moves in line with the connections of the third valve 125. The mobile phase flow travels through the third valve 125, into the first valve 115, through the vessel 130, through the second valve 120, through the tee 135 connected to the third valve 125 and continues to the column. This injects the entire sample, diluted and prepared with the mobile phase, in the column.

In some embodiments, actuating the syringe 105 and flowing the mobile phase through the third valve 125 and into the chromatography column are performed simultaneously.

The method can also include a step where the second valve 120 changes position to isolate the vessel 130 (see FIG. 3C). This allows time for the mixed mobile phase and sample to equilibrate prior to the mixed mobile phase and sample flowing to the chromatography column.

Another configuration of a three valve system for liquid sample introduction into a chromatography system is shown in FIGS. 4A-4D. The system 200 include a sample syringe 205 for drawing up a sample 210. The system also include a first multi-port valve 215, a second multi-port valve 220 and a third multi-port valve 225. The first valve 215 is in fluid communication with the sample syringe 205 and the sample 210. The second valve 220 is in fluid communication with the first valve 215 and a vessel 230. The third valve 225 is in fluid communication with the second valve 220 and a chromatography column. A pump (not shown) is in fluid communication with the third valve 224 and a mobile phase, for example, carbon dioxide.

Figure 4A:
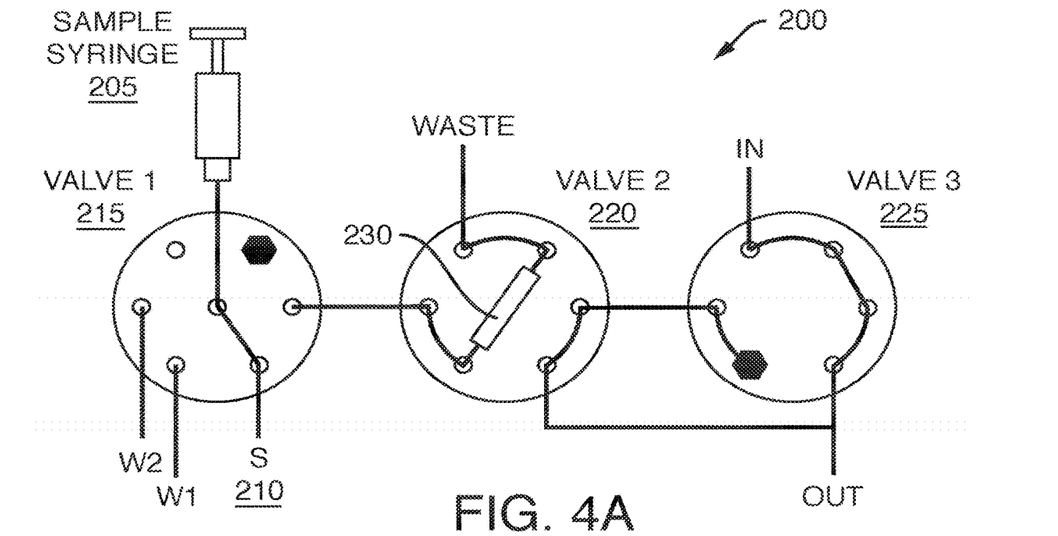
FIG. 4A is a schematic diagram showing another three-valve system for liquid sample introduction into a chromatography system with the valves in a first position, according to an illustrative embodiment of the technology.

Referring to FIG. 4A, when the valves 215, 220, and 225 are in a first position, the sample syringe 205 draws up the sample 210. The sample 210 can be drawn up into the sample syringe 205, for example, at least partially filling the syringe 205. The mobile phase flows to the chromatography column, through the third valve 225.

Figure 4B:
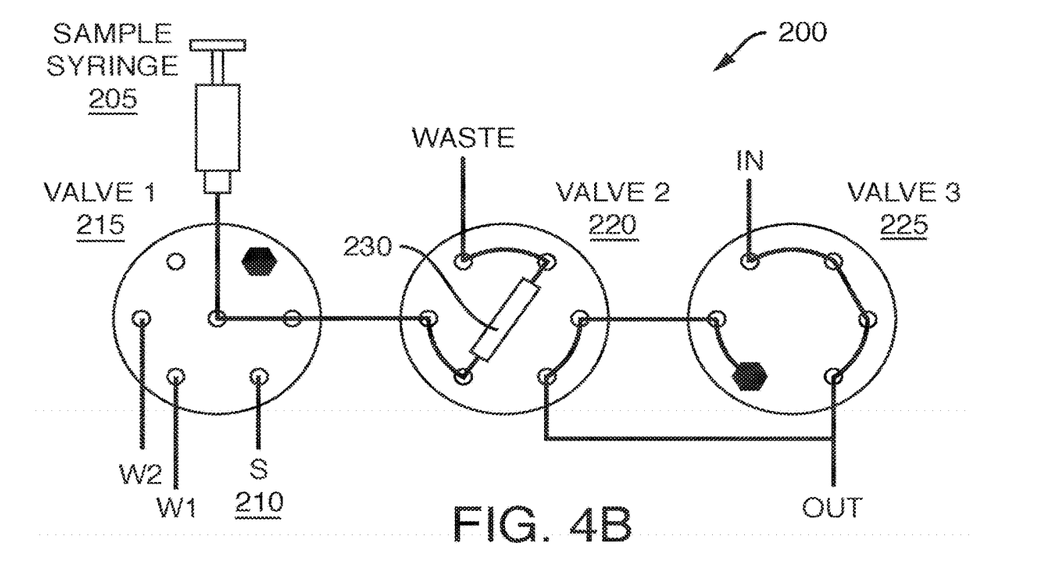
FIG. 4B is a schematic diagram showing the other three-valve system for liquid sample introduction into a chromatography system with the valves in a second position, according to an illustrative embodiment of the technology.

Referring to FIG. 4B, when the valves 215, 220, and 225 are in a second position, the sample flows from the sample syringe 205 to the vessel 230. The mobile phase continues to flow to the chromatography column. In FIG. 4B, the first valve 215 has moved in position with the second valve 220 and the sample syringe 205 pushes the sample into the vessel 230. The vessel 230 can be a tube, a cylinder or an enclosed volume of any shape or size. The volume of the vessel can be considerably higher, for example double, the volume of the connecting tubes. The vessel 230 is partially filled with sample 210. For example, the vessel 230 can be a quarter, half or three-quarters filled with sample 210.

Figure 4C:
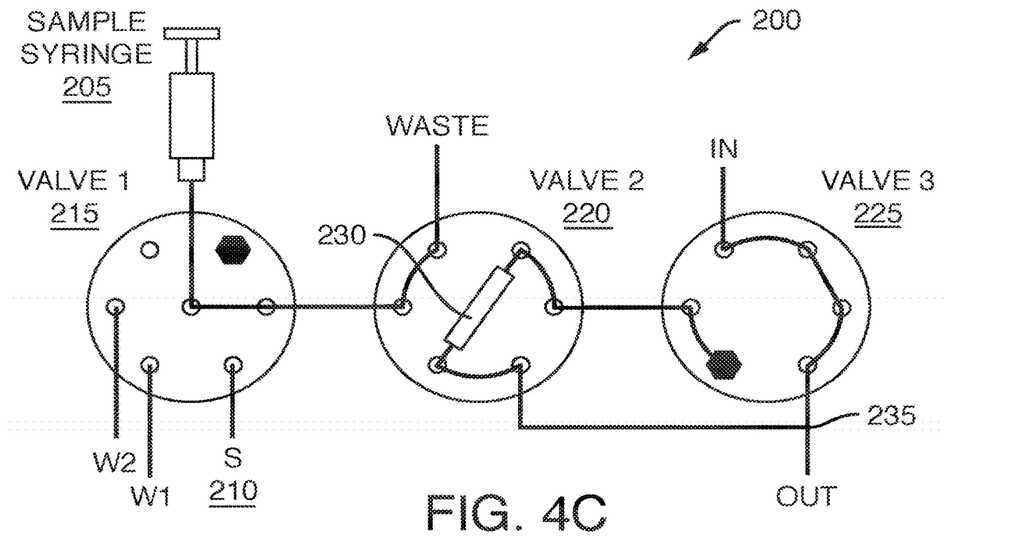
FIG. 4C is a schematic diagram showing the other three-valve system for liquid sample introduction into a chromatography system with the valves in a third position, according to an illustrative embodiment of the technology.

Referring to FIG. 4C, when the valves 215, 220, and 225 are in a third position, at least a portion of the mobile phase flows into the vessel 230, mixing with and pressurizing the sample 210. The second valve 230 actuates to be in line with the third valve 225. Flow of the mobile phase from the pump flows through the third valve 225 and into an intersection, junction, or tee 235, which splits the flow between the chromatography column (out) and to the second valve 220. The tee 235 can be in communication with the third valve 225, the second valve 220 and the chromatography column. The remaining volume of the vessel 230 fills with the mobile phase and is pressurized to the same pressure as the rest of the system 200. In some embodiments less than the total volume of the vessel 230 fills with the mobile phase and sample.

Figure 4D:
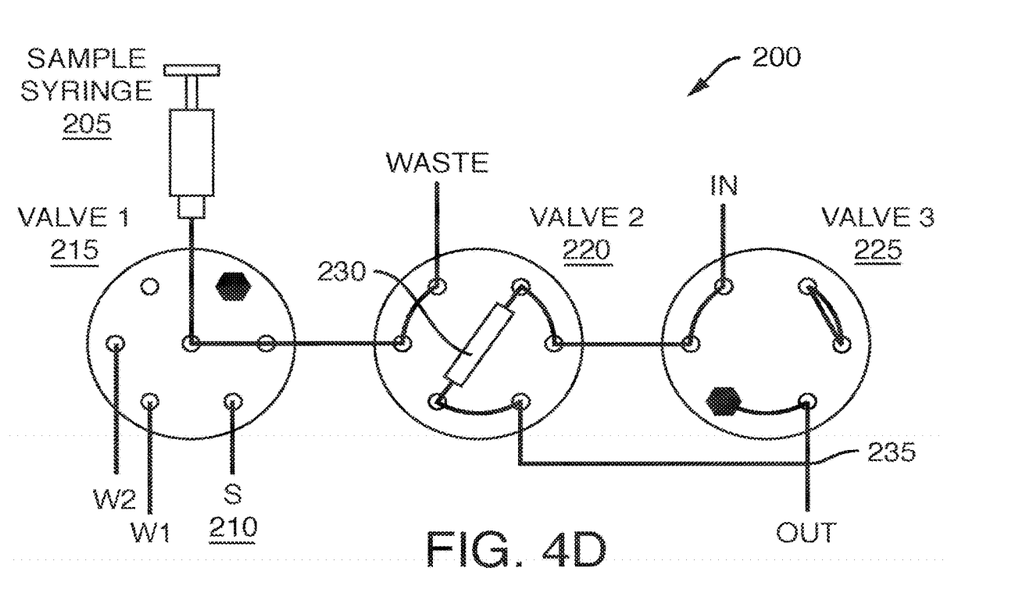
FIG. 4D is a schematic diagram showing the other three-valve system for liquid sample introduction into a chromatography system with the valves in a fourth position, according to an illustrative embodiment of the technology.

Referring to FIG. 4D, when the valves 215, 220, and 225 are in a fourth position, the mixed and pressurized sample flows into the chromatography column. The third valve 225 actuates and the total flow travels from the third valve 225 to the second valve 220, through the vessel 230 and into the column through the tee 235.

The first valve 215, the second valve 220, and the third valve 225 can each have six, eight, or ten ports. In some embodiments, the valves have less than six ports, for example four ports, or more than ten ports, for example twelve ports. The valves 215, 220, and 225 can each have the same number or ports or the each valve can have a different number of ports. The valves 215, 220, and 225 can be rotary valves, solenoid valves, or pneumatic valves. In some embodiments, the valves 215, 220, and 225 are all rotary valves. In other embodiments, the valves 215, 220, and 225 are all solenoid valves. In some embodiments, the valves 215, 220, and 225 are all pneumatic valves. The valves 215, 220, and 225 can be different valves, for example, valve 215 can be a rotary valve and valves 220 and 225 can be solenoid valves or valve 215 can be a rotary valve, valve 220 can be a solenoid valve and valve 225 can be a pneumatic valve.

The mobile phase can be a highly-compressible solvent, for example, the mobile phase can be carbon dioxide. The chromatography system can be a supercritical fluid chromatography system.

A three-valve method for introducing a liquid sample into a chromatography system, for example the system of FIGS. 4A-4D is also provided. Referring to FIG. 4A, a syringe 205 in fluid communication with a first valve 215 is actuated to draw liquid sample 210 through the first valve 215 and into the syringe 205. The mobile phase, for example a highly-compressible solvent, is flowed through a third valve 225 and into a chromatography column. These two steps can be performed simultaneously. The highly-compressible solvent can be carbon dioxide.

Referring to FIG. 4B, the first valve 210 is adjusted such that liquid sample flows from the syringe 205 into a vessel 230 of a second valve 220. The liquid sample partially fills the vessel 230.

Referring to FIG. 4C, the method also includes adjusting the second valve 220 such that a first portion of the mobile phase flows into the chromatography column and a second portion of the mobile phase flows into the vessel 230, thereby mixing and pressurizing the liquid sample and the mobile phase.

Referring to FIG. 4D, the method also includes adjusting the third valve 225 such that the mixed mobile phase and sample are injected into the chromatography column. The third valve 225 actuates and total flow travel from the third valve 225 to the second valve 220, through the vessel 230 and onto the column.

One of ordinary skill in the art will appreciate further features and advantages of the invention based on the above-described embodiments. Accordingly, the invention is not to be limited by what has been particularly shown and described, except, as indicated by the appended claims. All publications and references cited herein are expressly incorporated herein by reference in their entirety.

REFERENCES

FIG. 2: L. Miller, I Sebastian, J. Chromatogr. A 1250 (2012) 256-263.

What is claimed is:

1. A system for liquid sample introduction into a chromatography system, the system comprising:
a sample syringe for drawing up a sample;
a first multi-port valve in fluid communication with the sample syringe;
a second multi-port valve in fluid communication with the sample;
a vessel located between, and in fluid communication with, the first and second multi-port valves;
a third multi-port valve in fluid communication with the first multi-port valve, the second multi-port valve and a chromatography column; and
a pump in fluid communication with the third multi-port valve and a mobile phase;
wherein (1) when the first multi-port valve, the second multi-port valve, and the third multi-port valve are in a first position, the sample syringe draws the sample into the vessel and the mobile phase flows to the chromatography column; (2) when the first multi-port valve, the second multi-port valve, and the third multi-port valve are in a second position, at least a portion of the mobile phase flows into the vessel, mixing with and pressurizing the sample; and (3) when the first multi-port valve, the second multi-port valve, and the third multi-port valve are in a third position, the mixed and pressurized sample flows to the chromatography column.

2. The system of claim 1, further comprising a tee in fluid communication with the third multi-port valve, the second multi-port valve, and the column.

3. The system of claim 1, wherein the first multi-port valve, the second multi-port valve and the third multi-port valve are rotary valves, solenoid valves, or pneumatic valves.

4. The system of claim 1, wherein the first multi-port valve, the second multi-port valve and the third multi-port valve have four ports, six ports, eight ports, or ten ports.

5. The system of claim 1, wherein the first multi-port valve has a different number of ports than the second multi-port valve.

6. The system of claim 1, wherein the mobile phase is a highly-compressible solvent.

7. The system of claim 6, wherein the highly-compressible solvent is carbon dioxide.

8. The system of claim 1, wherein the chromatography system is a supercritical fluid chromatography system.

9. A method for introducing a liquid sample into a chromatography system, the method comprising:
drawing the liquid sample through a second valve by actuating a syringe in fluid communication with a first valve, thereby partially filling a vessel with the liquid sample;
flowing a mobile phase through a third valve into a chromatography column;
flowing a first portion of the mobile phase into the chromatography column and flowing a second portion of the mobile phase into the vessel by adjusting the second valve, thereby mixing and pressurizing the liquid sample and the mobile phase; and
injecting the mixed and pressurized liquid sample and mobile phase into the chromatography column by adjusting the first valve, the second valve and the third valve.

10. The method of claim 9, wherein the vessel is positioned between the first and second valves.

11. The method of claim 9, wherein drawing the liquid sample through a second valve and flowing a mobile phase through a third valve into a chromatography column are performed simultaneously.

12. The method of claim 9, wherein the mobile phase is a highly-compressible solvent.

13. The method of claim 12, wherein the highly-compressible solvent is carbon dioxide.

14. A system for liquid sample introduction into a chromatography system, the system comprising:
a sample syringe for drawing up a sample;
a first multi-port valve in fluid communication with the sample syringe and the sample;
a second multi-port valve in fluid communication with the first multi-port valve and a vessel;
a third multi-port valve in fluid communication with the second multi-port valve and a chromatography column; and
a pump in fluid communication with the third multi-port valve and a mobile phase;
wherein (1) when the first multi-port valve, the second multi-port valve, and the third multi-port valve are in a first position, the sample syringe draws the sample and the mobile phase flows to the chromatography column; (2) when the first multi-port valve, the second multi-port valve, and the third multi-port valve, are in a second position, the sample flows from the sample syringe to the vessel and the mobile phase continues to flow to the chromatography column; (3) when the first multi-port valve, the second multi-port valve, and the third multi-port valve are in a third position at least a portion of the mobile phase flows into the vessel, mixing with and pressurizing the sample; and (4) when the first multi-port valve, the second multi-port valve, and the third multi-port valve are in a fourth position, the mixed and pressurized sample flows to the chromatography column.

15. The system of claim 14, further comprising a tee in fluid communication with the third multi-port valve, the second multi-port valve, and the column.

16. The system of claim 14, wherein the first multi-port valve, the second multi-port valve and the third multi-port valve are rotary valves, solenoid valves or pneumatic valves.

17. The system of claim 14, wherein the first multi-port valve, the second multi-port valve and the third multi-port valve have four ports, six ports, eight ports, or ten ports.

18. The system of claim 14, wherein the first multi-port valve has a different number of ports than the second multi-port valve.

19. The system of claim 14, wherein the mobile phase is a highly-compressible solvent.

20. The system of claim 19, wherein the highly-compressible solvent is carbon dioxide.

21. The system of claim 14, wherein the chromatography system is a supercritical fluid chromatography system.

* * * * *